(12) United States Patent
Kaucic et al.

(10) Patent No.: US 7,889,835 B2
(45) Date of Patent: Feb. 15, 2011

(54) SYSTEM AND METHOD FOR DETECTING AN OBJECT BY DYNAMICALLY ADJUSTING COMPUTATIONAL LOAD

(75) Inventors: Robert August Kaucic, Niskayuna, NY (US); Ricardo Scott Avila, Clifton Park, NY (US); Samit Kumar Basu, Niskayuna, NY (US); Forrest Frank Hopkins, Scotia, NY (US)

(73) Assignee: Morpho Detection, Inc., Newark, CA (US)

( * ) Notice: Subject to any disclaimer, the term of this patent is extended or adjusted under 35 U.S.C. 154(b) by 1433 days.

(21) Appl. No.: 10/737,887

(22) Filed: Dec. 18, 2003

(65) Prior Publication Data

US 2005/0031069 A1    Feb. 10, 2005

Related U.S. Application Data

(60) Provisional application No. 60/493,589, filed on Aug. 7, 2003.

(51) Int. Cl.
*G01N 23/04* (2006.01)
*A61B 6/03* (2006.01)

(52) U.S. Cl. ............. 378/8; 378/4; 378/9; 378/10; 378/15; 378/19; 378/53; 378/57; 378/97; 378/901; 340/521; 340/522

(58) Field of Classification Search ............. 378/4, 378/9, 15, 19, 8, 10, 53, 57, 901; 340/521, 340/522
See application file for complete search history.

(56) References Cited

U.S. PATENT DOCUMENTS

| | | | |
|---|---|---|---|
| 3,432,664 A | 3/1969 | Robison | |
| 3,518,433 A | 6/1970 | Owen | |
| 3,714,486 A | 1/1973 | McCrary | |
| 3,783,288 A | 1/1974 | Barbour et al. | |

(Continued)

FOREIGN PATENT DOCUMENTS

EP    1230950 B1    9/2002

(Continued)

OTHER PUBLICATIONS

"Three-Dimensional Multi-Scale Line Filter for Segmentation and Visualization of Curvilinear Structures in Medical Images," Y. Sato et al., Medical Image Analysis (1998) vol. 2, No. 2, pp. 143-168.

(Continued)

*Primary Examiner*—Brian Casler
*Assistant Examiner*—Baisakhi Roy
(74) *Attorney, Agent, or Firm*—Armstrong Teasdale, LLP

(57) ABSTRACT

A system and method for ascertaining the identity of an object within an enclosed article. The system includes an acquisition subsystem, a reconstruction subsystem, a computer-aided detection (CAD) subsystem, and an alarm resolution subsystem. The acquisition subsystem communicates view data to the reconstruction subsystem, which reconstructs it into image data and communicates it to the CAD subsystem. The CAD subsystem analyzes the image data to ascertain whether it contains any area of interest. A feedback loop between the reconstruction and CAD subsystems allows for continued, more extensive analysis of the object. Other information, such as risk variables or trace chemical detection information may be communicated to the CAD subsystem to dynamically adjust the computational load of the analysis.

47 Claims, 7 Drawing Sheets

U.S. PATENT DOCUMENTS

| | | | |
|---|---|---|---|
| 3,919,467 A | 11/1975 | Peugeot | |
| 4,200,800 A | 4/1980 | Swift | |
| 4,289,969 A | 9/1981 | Cooperstein et al. | |
| 4,366,382 A | 12/1982 | Kotowski | |
| 4,736,396 A | 4/1988 | Boyd et al. | |
| 5,023,895 A | 6/1991 | McCroskey et al. | |
| 5,115,394 A | 5/1992 | Walters | |
| 5,157,261 A | 10/1992 | Grey et al. | |
| 5,182,764 A | 1/1993 | Peschmann et al. | |
| 5,200,626 A | 4/1993 | Schultz et al. | |
| 5,247,561 A | 9/1993 | Kotowski | |
| 5,305,363 A | 4/1994 | Burke et al. | |
| 5,490,218 A | 2/1996 | Krug et al. | |
| 5,491,734 A | 2/1996 | Boyd et al. | |
| 5,642,393 A * | 6/1997 | Krug et al. | 378/57 |
| 5,784,481 A | 7/1998 | Hu | |
| 5,796,802 A * | 8/1998 | Gordon | 378/8 |
| 5,838,758 A | 11/1998 | Krug et al. | |
| 5,907,593 A | 5/1999 | Hsieh et al. | |
| 6,115,448 A | 9/2000 | Hoffman | |
| 6,130,929 A | 10/2000 | Saha | |
| 6,207,958 B1 | 3/2001 | Giakos | |
| 6,272,230 B1 | 8/2001 | Hiraoglu et al. | |
| 6,385,292 B1 | 5/2002 | Dunham et al. | |
| 6,418,189 B1 | 7/2002 | Schafer | |
| 6,574,299 B1 | 6/2003 | Katsevich | |
| 6,628,745 B1 | 9/2003 | Annis et al. | |
| 6,721,391 B2 | 4/2004 | McClelland et al. | |
| 6,739,511 B2 * | 5/2004 | Tsikos et al. | 235/462.01 |
| 6,771,732 B2 * | 8/2004 | Xiao et al. | 378/4 |
| 6,952,163 B2 * | 10/2005 | Huey et al. | 340/521 |
| 7,139,406 B2 | 11/2006 | McClelland et al. | |
| 7,317,390 B2 * | 1/2008 | Huey et al. | 340/552 |
| 7,492,855 B2 * | 2/2009 | Hopkins et al. | 378/10 |
| 2002/0085674 A1 | 7/2002 | Price et al. | |
| 2003/0035507 A1 | 2/2003 | Hsu et al. | |
| 2003/0072407 A1 | 4/2003 | Mihara et al. | |
| 2004/0017888 A1 | 1/2004 | Seppi et al. | |
| 2004/0109532 A1 | 6/2004 | Ford et al. | |
| 2004/0213378 A1 | 10/2004 | Zhou et al. | |

FOREIGN PATENT DOCUMENTS

| | | |
|---|---|---|
| EP | 1277439 | 1/2003 |
| GB | 1390575 | 4/1975 |
| WO | 99/67806 | 6/1998 |
| WO | 9919716 A1 | 4/1999 |
| WO | 03029844 A2 | 4/2003 |

OTHER PUBLICATIONS

International Search Report and Written Opinion Issued for PCT/US2004/022705, dated Dec. 13, 2005.

International Search Report and Written Opinion Issued for PCT/US2004/023170, dated Sep. 21, 2005.

Luggar et al., "Optimisation of Low Angle X-Ray Scatter System for Explosive Detection," Proceedings of the Spie, vol. 2511, pp. 46-55, Jun. 21, 1995.

Final Office action regarding U.S. Appl. No. 10/743,195, dated Jun. 27, 2008.

Final Office action regarding U.S. Appl. No. 10/743,195, dated Oct. 31, 2007.

Non-final Office action regarding U.S. Appl. No. 10/743,195, dated May 31, 2007.

Non-final Office action regarding U.S. Appl. No. 10/743,195, dated Nov. 28, 2006.

Final Office action regarding U.S. Appl. No. 10/743,195, dated Mar. 16, 2006.

Final Office action regarding U.S. Appl. No. 10/743,195, dated Nov. 15, 2005.

Non-final Office action regarding U.S. Appl. No. 10/743,195, dated May 2, 2005.

* cited by examiner

SYSTEM AND METHOD FOR DETECTING AN OBJECT BY DYNAMICALLY ADJUSTING COMPUTATIONAL LOAD

CROSS-REFERENCE TO RELATED APPLICATIONS

This application claims the benefit of U.S. Provisional Application No. 60/493,589, filed Aug. 7, 2003, the entirety of which is incorporated herein by reference.

BACKGROUND

The invention relates generally to a system and a method for detecting an object, and more particularly to a system and a method for detecting the identity of an object within an enclosed article.

There has always been, and there continues to be, a demand for heightened security surrounding various communication and transportation venues. For example, metal detectors and x-ray machines are standard security devices employed at airports for screening passengers and their carry-on and checked luggage. The United States Postal Service also employs x-ray technology for screening parcels.

The capability for automatically screening a high-throughput of luggage in an efficient and cost-effective manner is currently non-existent. The screening systems currently in place record false positives at rates that are higher than desirable. The high number of false positives forces alternative follow-on inspections, such as trace detection or manual inspection of the luggage, thereby increasing the average screening time per bag substantially. There remains a need for a high-throughput (e.g., at least one thousand scanned checked bags per hour) automatic screening system for ascertaining whether a piece of luggage or a mail parcel contains an object which may be harmful, such as, for example, an explosive device or material.

SUMMARY

Figure 1:
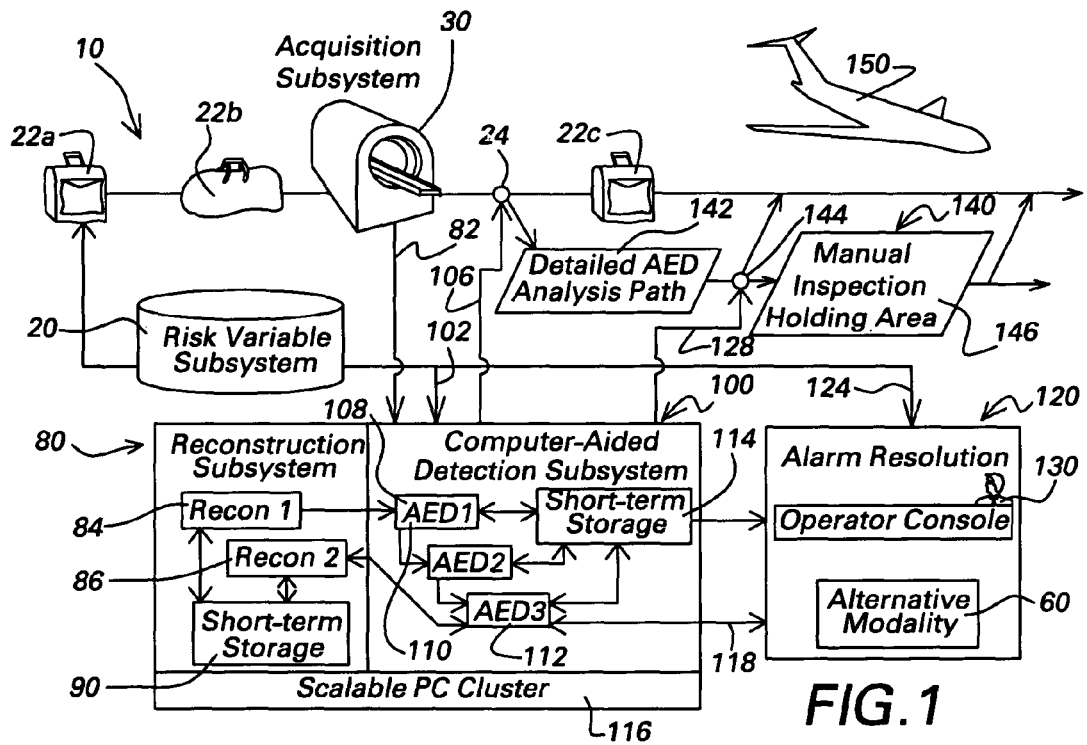
FIG. 1 is a perspective schematic view of an object detecting system in accordance with an embodiment of the invention.

The present invention describes a system and a method for ascertaining whether a harmful object, such as an explosive device or material, is located within a closed article, such as a piece of luggage or a parcel.

One aspect of the invention is a system for detecting an object. The system includes a reconstruction subsystem for reconstructing acquired information pertaining to an object into image data, a computer-aided detection subsystem for analyzing the image data, and a feedback loop between the reconstruction subsystem and the computer-aided detection subsystem.

Another aspect of the invention is a system for detecting an explosive device within an article. The system includes an acquisition subsystem having a scanning device with at least one scanning detector for acquiring view data of the contents of an article. The system also includes a reconstruction subsystem comprising a plurality of reconstruction stages for reconstructing the view data into image data, a computer-aided detection subsystem comprising a plurality of computer-aided detection stages for analyzing the image data, and a feedback loop between the reconstruction subsystem and the computer-aided detection subsystem for multi-stage reconstructing and analyzing to ascertain whether the contents of the article include an explosive device.

Another aspect of the invention is a system for detecting an object located within an article. The system includes a reconstruction subsystem for reconstructing acquired information pertaining to an object into image data, a computer-aided detection subsystem adapted to analyze the image data, and a risk variables subsystem for dynamically adjusting the computational load of the reconstruction and computer-aided detection subsystems.

Another aspect of the invention is a method for identifying an object including the steps of preparing view data of an object, preparing image data from the view data, and identifying an area of interest based upon an analysis of the image data, wherein the area of interest comprises the object.

Another aspect of the invention is a method for detecting an explosive device within an article. The method includes the steps of acquiring view data of an object located within an article from a scanning device, communicating the view data of the object to a plurality of reconstruction stages, reconstructing the view data of the object into image data of the object with the plurality of reconstruction stages, and analyzing the image data of the object to identify whether the object is an explosive device.

Another aspect of the invention is a method for detecting an object located within an article. The method includes the steps of reconstructing acquired information pertaining to an object into image data, analyzing the image data, and dynamically adjusting the computational load of the reconstructing and analyzing steps.

These and other advantages and features will be more readily understood from the following detailed description of preferred embodiments of the invention that is provided in connection with the accompanying drawings.

DETAILED DESCRIPTION OF THE PREFERRED EMBODIMENTS

An object detecting system 10 is shown in FIG. 1. The illustrated object detecting system 10 includes a risk variable subsystem 20, an acquisition subsystem 30, an alternative modality subsystem 60, a reconstruction subsystem 80, a computer-aided detection (CAD) subsystem 100, and an alarm resolution subsystem 120. The object detecting system 10 is adapted to accommodate a high throughput of articles, for example, screening of upwards of one thousand individual pieces of checked luggage within a one hour time period, in an expeditious manner with a high detection rate and a tolerable number of false positives.

The risk variable subsystem 20, which is a subsystem that collects externally provided risk data, serves to alter the parameters by which a specific article is investigated. Specifically, the risk variable subsystem 20 provides relevant risk variables to the CAD subsystem 100 for the purpose of dynamically adjusting the computational load on the reconstruction subsystem 80 and the CAD subsystem 100. The risk variable subsystem 20 includes a compendium of risk related information appropriate for a specified task. For example, a risk variable subsystem 20 used in a luggage screening operation at an airport may include information for a specific piece of luggage, such as luggage 22a, 22b or 22c (hereinafter luggage 22n), information related to a threat level index (e.g., red, orange, yellow, etc.), threat information directed at a specific region of the world, country, or airport, information on the destination of the specific luggage, information on the nationality or other relevant profile parameters of a passenger associated with the specific luggage, or any other appropriate factors. The information, or generated risk variables, of the risk variable subsystem 20 may be used, for example, in conjunction with other information gleaned on a specific piece of luggage to ascertain whether that luggage is more or less likely to include any object which may be harmful to passengers on an airliner containing that luggage, such as, for example, an explosive device or material. If certain threat-related information is associated with a specific piece of luggage, the risk variable subsystem 20 may heighten investigative parameters used on that piece of luggage, and hence increase the computational load on the reconstruction subsystem 80 and the CAD subsystem 100. The generated risk variables obtained through the risk related subsystem 20 are added to the totality of information utilized by the CAD subsystem 100 through a link 102.

Figure 3:
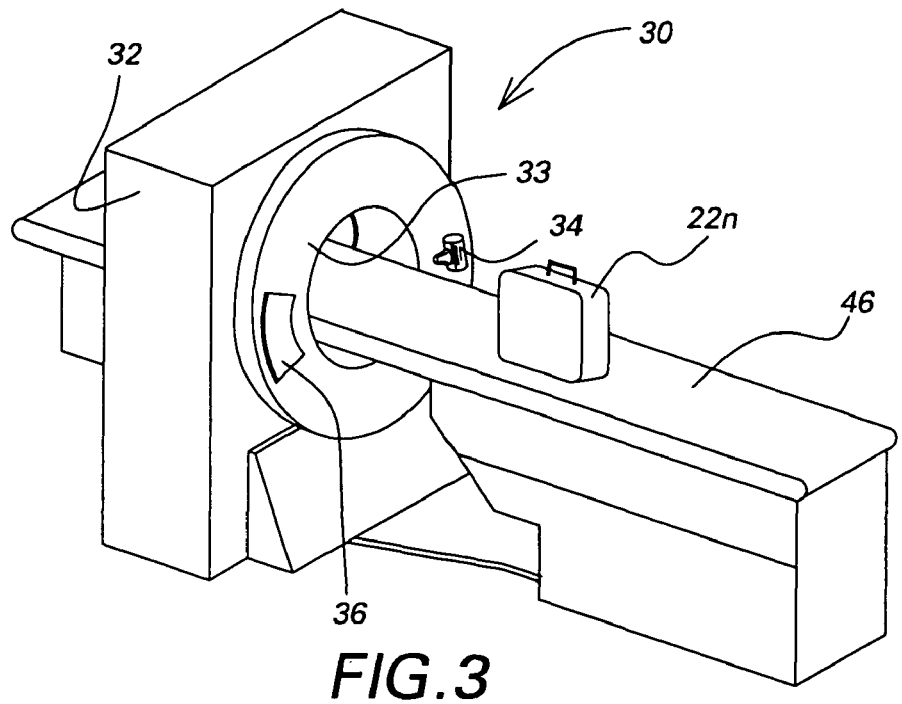
FIG. 3 is a perspective view of an exemplary embodiment of an acquisition subsystem for use in the object detecting system of FIG. 1.
Figure 4:
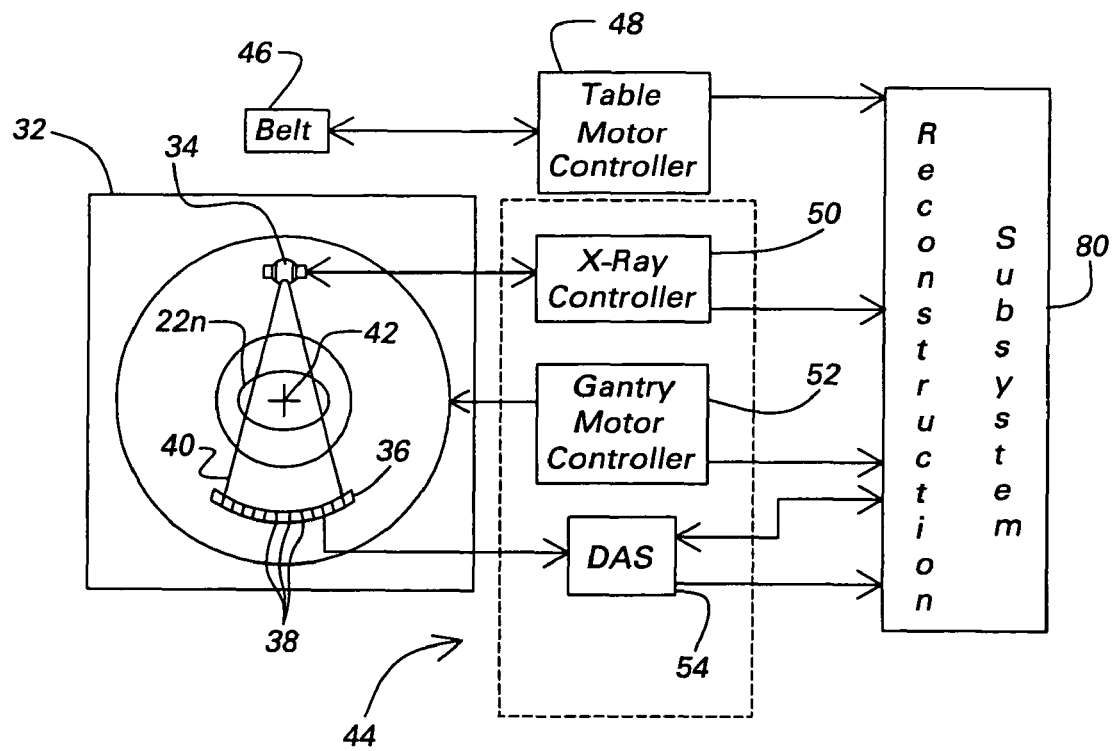
FIG. 4 is a block schematic view of the acquisition subsystem of FIG. 3 in communication with a reconstruction subsystem of the object detecting system of FIG. 1.

With reference to FIGS. 3 and 4, there is shown an acquisition subsystem 30 that is representative of a "third generation" computed tomography (CT) scanner. The acquisition subsystem 30 includes a rotating gantry 32 upon which an x-ray source 34 and a detector array 36 are mounted opposed to each other. As illustrated, the rotating gantry 32 includes an opening 33 through which a conveyor belt 46 extends. The x-ray source projects x-rays 40 toward the detector array 36, which includes a plurality of detector modules 38.

The detector modules 38 together sense the projected x-rays 40 that pass through a specific piece of luggage 22n. Each detector module 38 produces an electrical signal that represents the intensity of an impinging x-ray beam 40 and hence, by appropriate calibration, the attenuation of the beam 40 as it passes through the luggage 22n. During a scan to acquire x-ray view data, the gantry 32 and the components mounted thereon rotate about a center of rotation 42.

The rotation of the gantry 32 and the operation of x-ray source 34 are governed by a control mechanism 44 of the acquisition subsystem 30. In addition, a table motor controller 48 controls the conveyor belt 46 to position the luggage 22n in the gantry 32. Particularly, the conveyor belt 46 moves the luggage 22n through the gantry opening 33. The control mechanism 44 includes an x-ray controller 50 that provides power and timing signals to the x-ray source 34 and a gantry motor controller 52 that controls the rotational speed and position of the gantry 32. A data acquisition system (DAS) 54 in the control mechanism 44 samples analog data from detector modules 38 and converts the data to digital signals (view data) for subsequent processing. The digital signals, or view data, 200 (FIG. 9) are then communicated to either the reconstruction subsystem 80 or the CAD subsystem 100.

Figure 5:
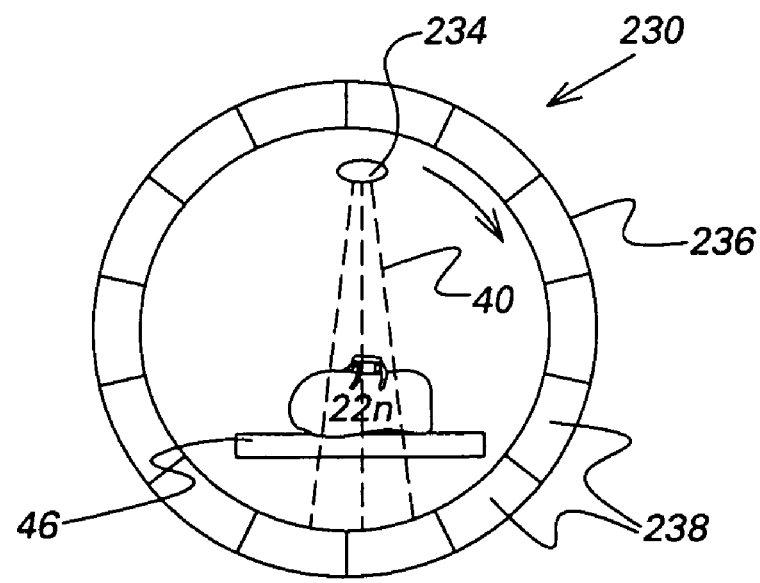
FIG. 5 is an end view of another exemplary embodiment of an acquisition subsystem for use in the object detecting system of FIG. 1.
Figure 9:
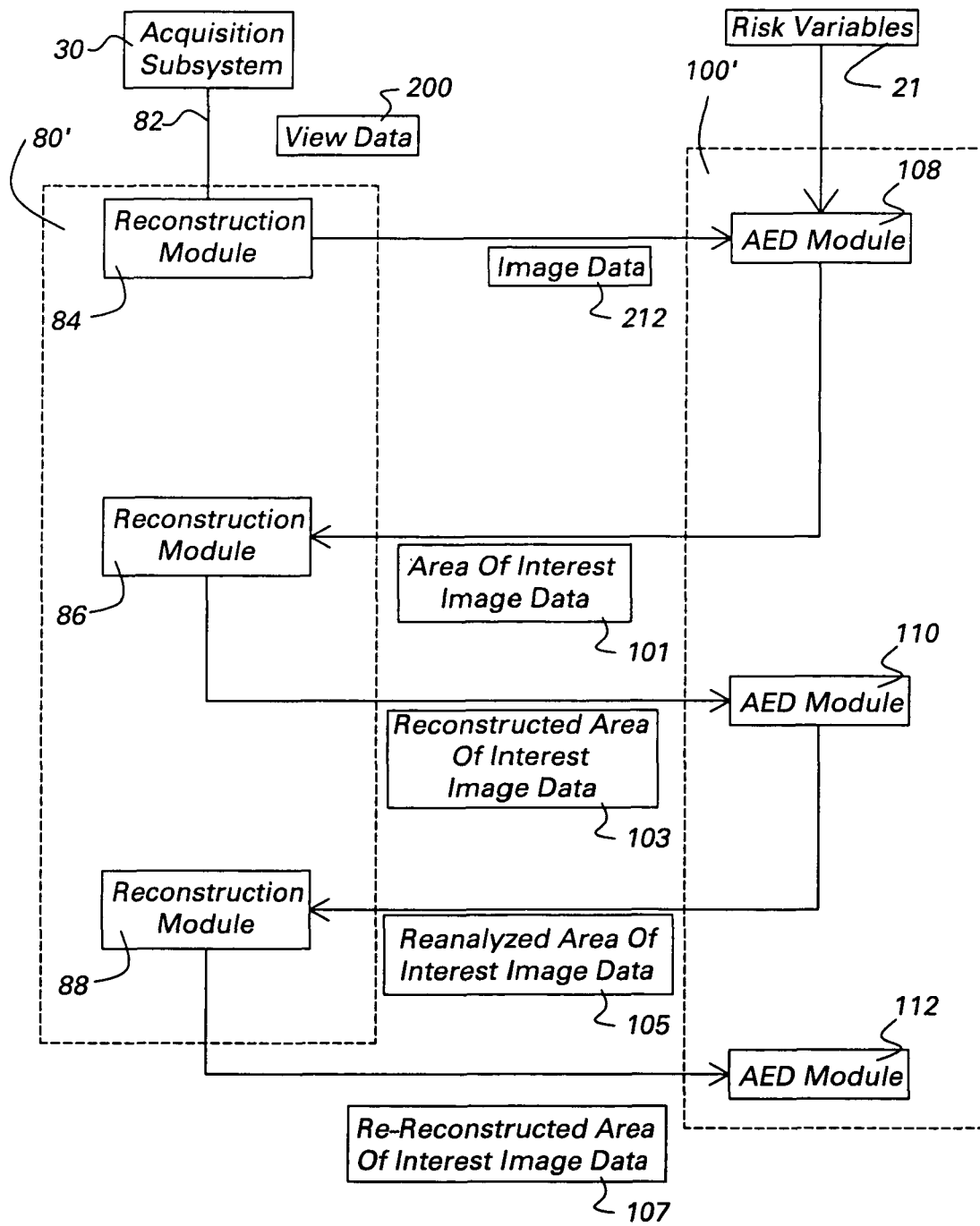
FIG. 9 is a block diagram illustrating an exemplary process for detecting an object within an article.

FIG. 5 illustrates another embodiment of an acquisition subsystem that may be utilized in the object detection system 10. Unlike the acquisition subsystem 30 (FIGS. 3, 4), the acquisition subsystem 230 illustrated in FIG. 5 includes a stationary detector ring 236 including a plurality of individual distributed detectors 238. An x-ray source 234 rotates around the piece of luggage 22n on the conveyor belt 46 to obtain intensity measurements that are generated into view data 200 (FIG. 9). The rotating x-ray source 234 emits a fan beam and illuminates each of the contiguous detectors 238 in sequence. Each of the detectors 238 within the arc of the fan beam at any instant is periodically sampled to provide the intensity measurements, which are then communicated to either the reconstruction subsystem 80 or the CAD subsystem 100 for generation into the view data 200. The acquisition subsystem 230 is commonly referred to as a $4^{th}$ generation CT scanner, and such scanners are commercially available from American Science and Engineering, Inc.

Figure 6:
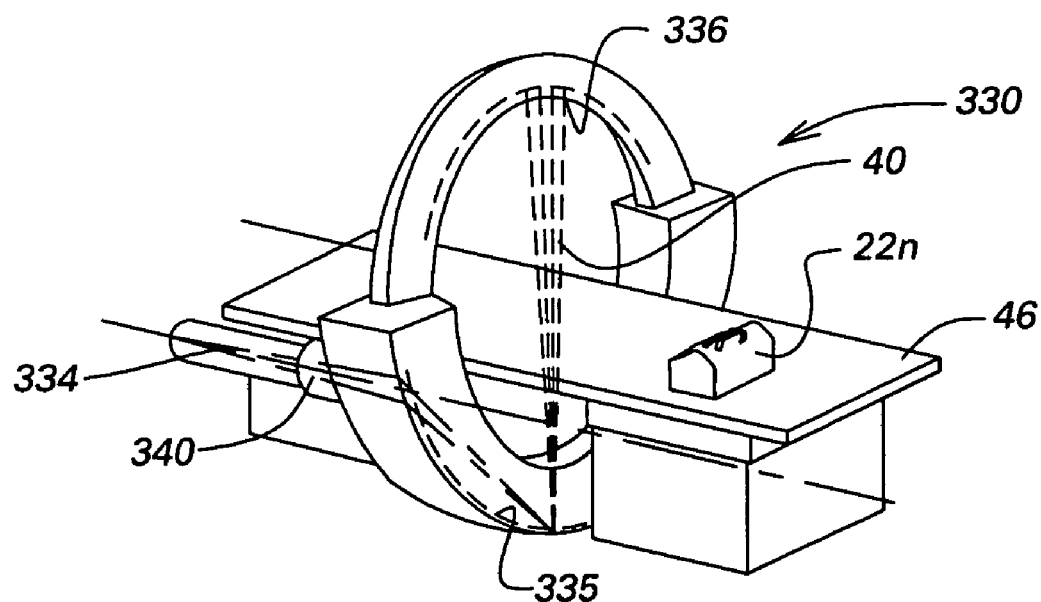
FIG. 6 is a perspective view of another exemplary embodiment of an acquisition subsystem for use in the object detecting system of FIG. 1.

FIG. 6 illustrates another embodiment of an acquisition subsystem for use in the object detection system 10, namely a $5^{th}$ generation CT scanner. A suitable $5^{th}$ generation CT scanner is one marketed under the trademark IMATRON® by Imatron Inc. The acquisition subsystem 330, a CT scanner having no moving parts, includes a vacuum housing chamber 334 that generates an electron beam 340. The electron beam 340 is caused to scan an arc-shaped target 335. Upon being struck by the electron beam 340, which typically scans 210 degrees or so in about 50 ms, the target 335 emits a moving fan-like beam of x-rays 40 that passes through a region of the luggage 22n lying atop the conveyor belt 46, and then registers upon a stationary detector array 336 (including distributed detectors not individually shown) located diametrically opposite thereto. The detector array 336 measures intensity profiles of transmitted x-ray beams, allowing generation of view data, or projection data, 200 (FIG. 9) that is then communicated to the reconstruction subsystem 80 or the CAD subsystem 100.

Figure 7A:
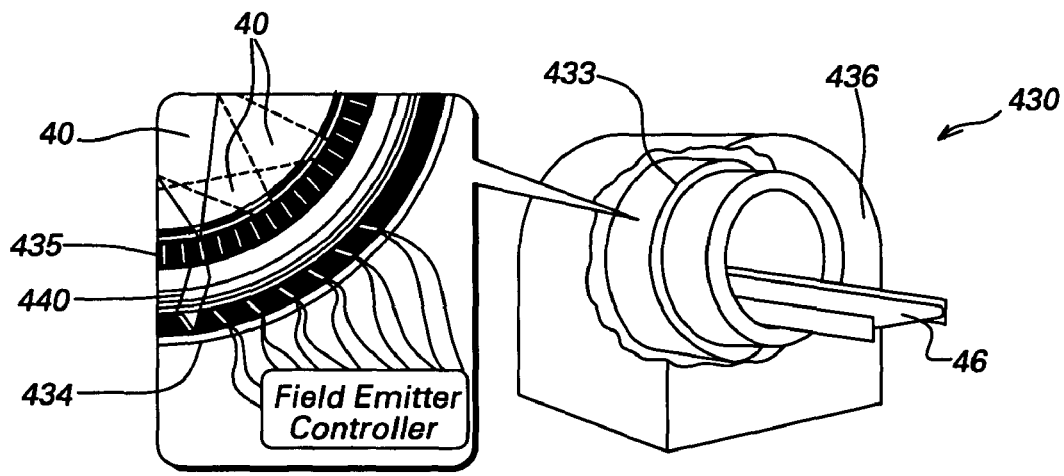
FIGS. 7a and 7b are partial cross-sectional perspective views of another exemplary embodiment of an acquisition subsystem for use in the object detecting system of FIG. 1.
Figure 7B:
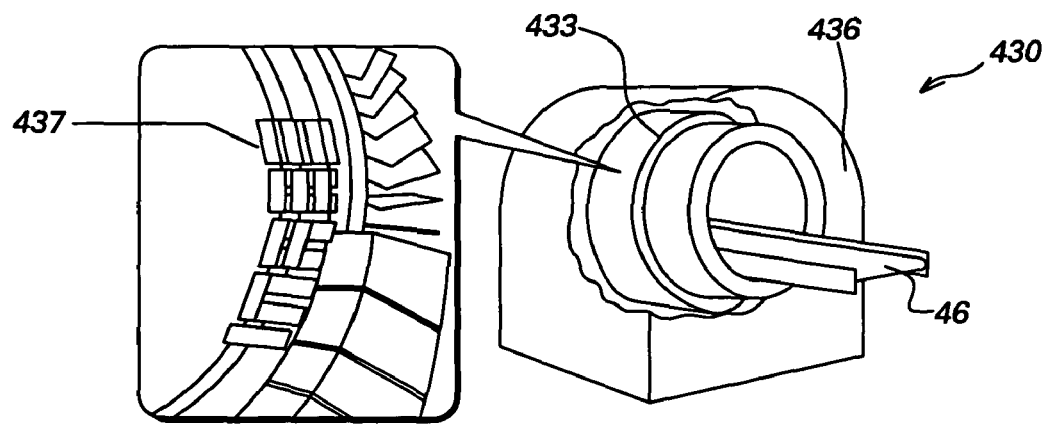

Next, with reference to FIGS. 7a and 7b, another embodiment of an acquisition subsystem for use in the object detection system 10 is described. Like the acquisition subsystem 330 (FIG. 6), the acquisition subsystem 430 includes a CT scanner having no moving parts. The stationary acquisition subsystem 430 includes a source ring 433 including a distributed x-ray source 434. The acquisition subsystem 430 further includes a detector ring 436 adjacent to the source ring 433. As illustrated, the detector ring 436 is offset from the source ring 433. It should be appreciated, however, that "adjacent to" should be interpreted in this context to mean the detector ring 436 is offset from, contiguous with, concentric with, coupled with, abutting, or otherwise in approximation with the source ring 433. The detector ring 436 includes a plurality of distributed detector modules 437 which may be in linear, multi-slice, or area detector arrangements. An exemplary embodiment of the detector module 437 includes a detector cell having a pitch of, for example, two millimeters by two millimeters, providing an isotropic resolution on the order of one cubic millimeter. Another exemplary embodiment of the detector module includes a detector cell having a pitch of one millimeter by one millimeter. Each of the x-ray sources 434 sends an electron beam 440 to a target ring 435, which in turn sends a fan-like beam of x-rays 40 toward the luggage 22n (FIG. 6) on the conveyor belt 46. The x-rays 40 travel through the luggage 22n, are attenuated to some extent by the contents of the luggage 22n, and impinge upon one or more discrete detector modules 437. A suitable detector module 437 may include a scintillation element or a direct conversion material. The detector modules 437 form intensity measurements from the x-rays 40, which are then generated into view data 200, and the view data is then communicated to the reconstruction subsystem 80 or the CAD subsystem 100.

The alternative modality subsystem 60 (FIG. 1) is an optional subsystem for use in the object detection system 10. The alternative modality subsystem 60 may include one or more additional investigative modalities that may be useful in ascertaining the identity of suspicious objects within closed articles. Examples of suitable additional investigative modalities include, for example, a trace detection subsystem, a coherent scattering detection subsystem, and a quadrupole resonance subsystem. The alternative modality subsystem 60 may be incorporated with the acquisition subsystem such that as a piece of luggage 22n passes by the acquisition subsystem, the alternative modality subsystem 60 can obtain additional data pertaining to the object within the luggage 22n. For example, for an alternative modality subsystem 60 having a trace detection subsystem, the trace detection subsystem can obtain data pertaining to average chemical compositions of material found on the luggage 22n. Such a trace detection subsystem may include chemical detectors and an apparatus designed to create a current or puff of air toward the detectors. The puff of air carries minute traces of chemicals from the luggage 22n toward the detectors. Alternatively, such a trace detection subsystem may utilize a swipe methodology at a predetermined location. By swiping the exterior of the luggage 22n, the swipe will pick up any minute traces of chemical compositions and can be analyzed to determine the likely chemicals found within the luggage 22n. The additional information gained through the alternative modality subsystem 60 is added to other information used by the CAD subsystem 100 through a link 118.

The reconstruction subsystem 80 is linked to the acquisition subsystem through a link 82. The view data 200 is received by the reconstruction subsystem 80 from the acquisition subsystem 30 (or the acquisition subsystems 230, 330, 430) through the first link 82. The reconstruction subsystem 80 includes a plurality of reconstruction stages 84, 86, each of which includes one or more algorithms for reconstructing a measured sinogram, or view data, 200. Short-term storage 90 is included within the reconstruction subsystem 80 and is in communication with each of the reconstruction stages 84, 86. The reconstruction subsystem 80 functions to reconstruct, or recompute, the view data 200 received from the acquisition subsystem 30, 230, 330, 430 into image data 212 (FIGS. 8, 9) which can then be communicated to the CAD subsystem 100 for further analysis.

The illustrated CAD subsystem 100 is in connection with a node 24 within the transportation line of the luggage 22n. The node 24 is a decision point at which, based upon information obtained through the CAD subsystem 100, one or more pieces of luggage 22n are shunted out of line to the aircraft 150 and to a manual inspection subsystem 140 including an alarm resolution area 142 and a manual inspection holding area 146.

Figure 8:
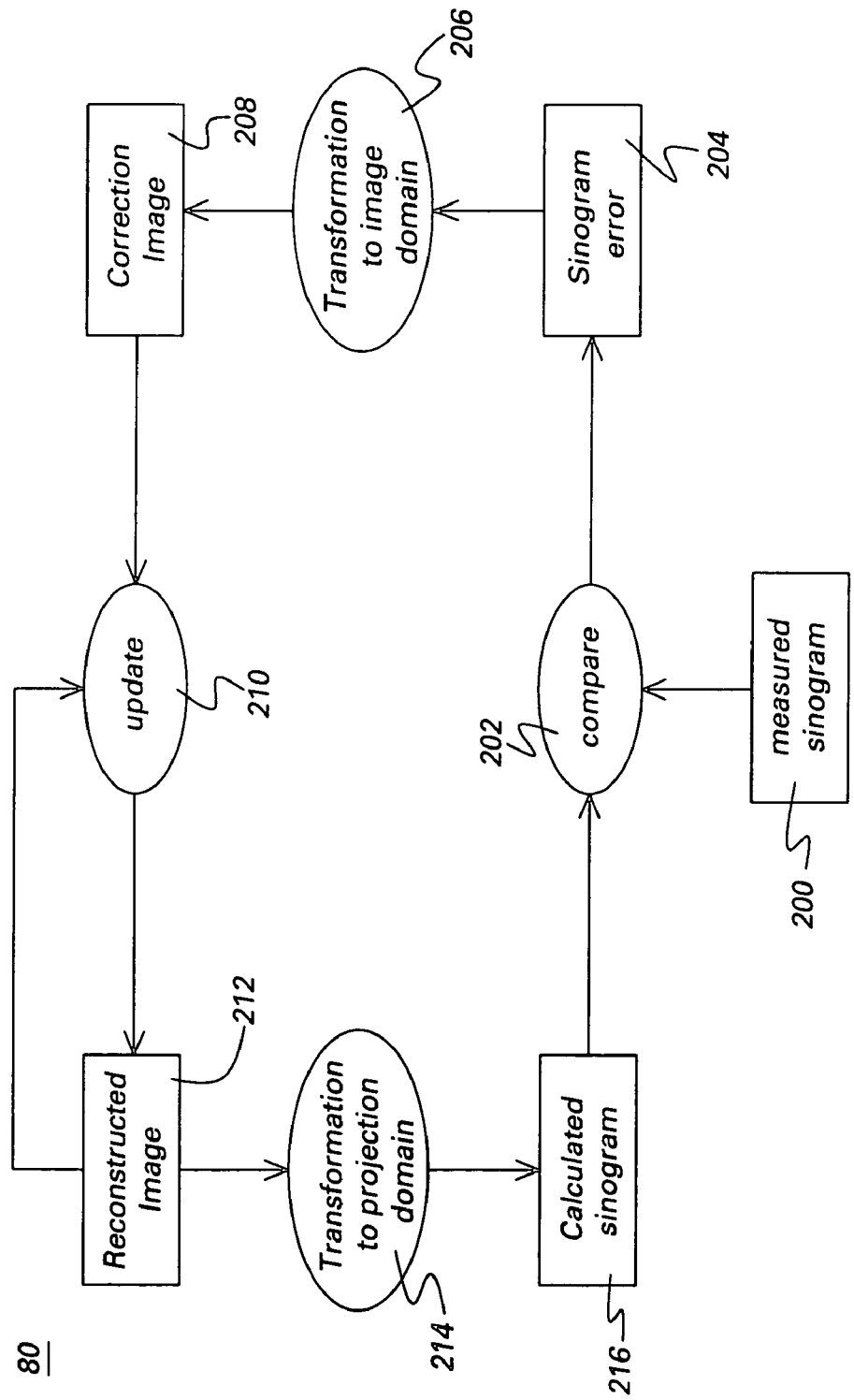
FIG. 8 illustrates an exemplary method for reconstructing image data in accordance with an embodiment of the invention.

The CAD subsystem 100 includes a plurality of automated explosive detection (AED) stages 108, 110, 112, which are in communication with the reconstruction stages 84, 86. As illustrated in FIG. 1, for example, the reconstruction stage 84 is in communication with the AED stage 108, which in turn is in communication with the AED stage 110 and the short-term storage 114. The AED stage 110 is in communication with both the short-term storage 114 and the AED stage 112. The reconstruction stage 86 is in communication with the short-term storage 90 and the AED stage 112. A scalable cluster of personal computers 116, potentially augmented with Field Programmable Gate Arrays (FPGA) or Application Specific Integrated Circuits (ASIC) for additional computational power, is utilized by both the reconstruction subsystem 80 and the CAD subsystem 100 to provide sufficient computing speed to the object detecting system 10. The CAD subsystem 100 works in conjunction with the reconstruction subsystem 80 to ascertain whether a specific piece of luggage 22n has an area of interest within the image data 212 (FIG. 8). By "area of interest" is meant an area within the image data 212 that has not yet been resolved into a specific object or into an object that, although not completely identified, has been identified enough to ascertain that it is not harmful.

The CAD subsystem 100 is in connection with the alarm resolution subsystem 120 through a link 118. The alarm resolution subsystem 120 includes a plurality of operator consoles 130a-n. Information from the risk variables subsystem 20 is communicated to the alarm resolution subsystem 120 via a link 124. The alarm resolution subsystem 120 utilizes operators at the operator consoles 130 to view specific pieces of luggage 22n that have been flagged as including an area of interest that has not yet been resolved. Specifically, image data 212 (FIG. 8) or reconstructed image data is sent to the alarm resolution subsystem 120 via the link 118 and one or more operators review the image data 212 and manipulate it to attempt to resolve an area of interest found within the image data 212. The decision by the CAD subsystem 100 is sent via a link 128 to a decision node 144, at which the specific luggage 22n will either be moved back to the line to the aircraft 150 or will be moved to the manual inspection holding area 146, at which a manual inspection of the specific luggage 22n will be undertaken to resolve the area of interest.

Figure 2:
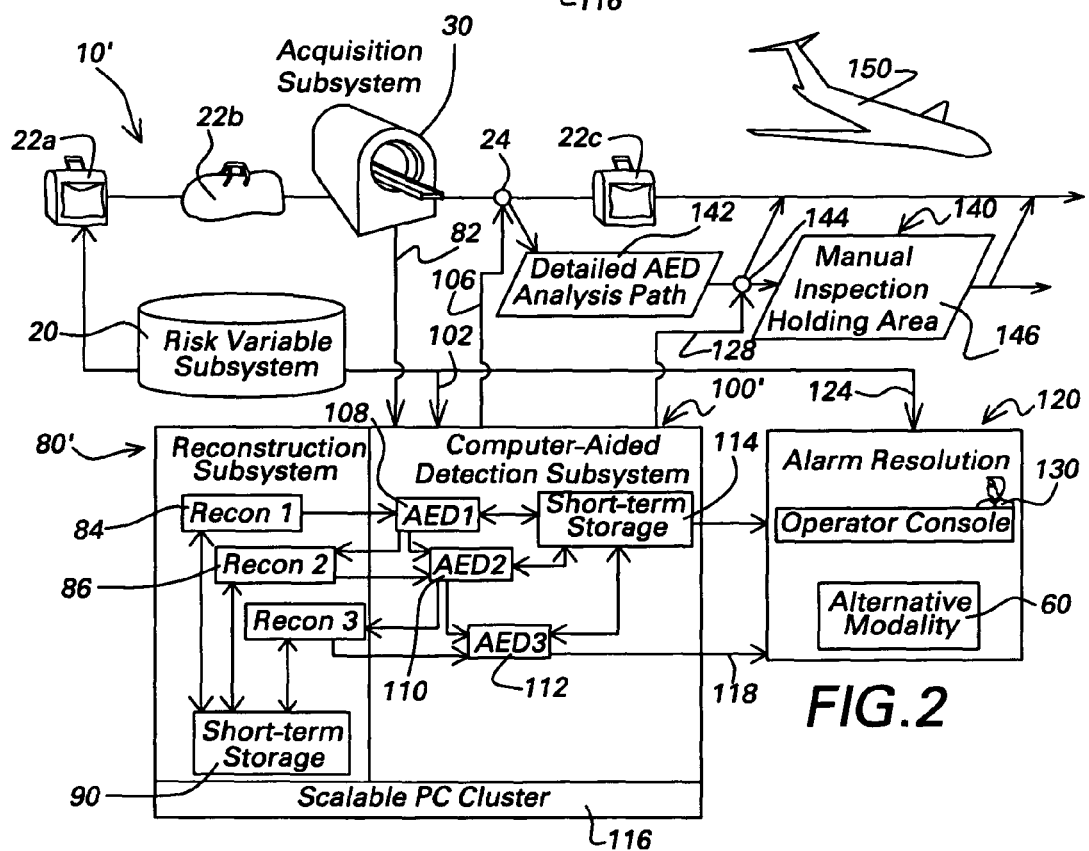
FIG. 2 is a perspective schematic view of one aspect of the object detecting system of FIG. 1.

An aspect of the object detection system is illustrated in FIG. 2. Specifically, an object detection system 10' shown in FIG. 2 differs from the object detection system 10 of FIG. 1 only in the reconstruction subsystem 80' and the CAD subsystem 100'. The reconstruction subsystem 80' includes a plurality of reconstruction stages 84, 86, 88, each of which includes one or more algorithms for reconstructing view data, 200 (FIGS. 8, 9). The CAD subsystem 100' includes AED stages 108, 110, 112. As illustrated in FIG. 2, the reconstruction stage 84 is in communication with the AED stage 108, which in turn is in communication with the short-term storage 114, the AED stage 110, and the reconstruction stage 86. The AED stage 110 is in communication with the AED stage 112, the short-term storage 114, and the reconstruction stage 88. The AED stage 112 is in communication with the short-term storage 114 and the alarm resolution subsystem 120 and the alternative modality subsystem 60 through the link 118.

Next will be described, with reference to FIGS. 2, 8 and 9, an exemplary method for determining the presence of an object within an article. This exemplary method involves filtered back-projection. Filtered back-projection is a set of mathematical formulae that directly transform view data into an image representation. For sake of simplicity, the example will be directed to the detection of an explosive device or material within a piece of luggage 22n. Beginning with the view data 200, numerous pre-processing steps that are mathematically prescribed are performed to create a modified view data set. Then, a back projection is performed to modify the modified view data set into the image domain to obtain a cross-sectional image of the object scanned, or a volumetric representation of the object in the case of a three-dimensional acquisition (as would occur with an area or multi-slice detector). An example of mathematical formulae that are sufficient for a three-dimensional filtered back projection may be found in U.S. Pat. No. 6,574,299, the entire contents of which is incorporated by reference herein.

An alternative embodiment of the method described above for reconstructing image data uses a multi-stage methodology for reconstruction. Multi-stage reconstruction may be done wholly in software, wholly in hardware, or in some combination of both software and hardware. As the luggage 22n is transported through the acquisition subsystem 30, 230, 330, 430, a plurality of data packets of view data 200 (FIG. 8), are prepared by the acquisition subsystem. As the luggage 22n continues on to the decision node 24, the view data 200 is communicated via link 82 to the reconstruction subsystem 80'. The reconstruction subsystem 80' compares, at a compare step 202, a calculated sinogram 216 (i.e., a set of predicted projection data) with the actual measured sinogram 200. Initially, the calculated sinogram 216 is a transformation from a predicted reconstructed image 212. In the first iteration, the reconstructed image 212 may be any appropriate default setting. As a result of the comparison of the calculated sinogram 216 and the measured sinogram 200, a sinogram error 204 is produced. The sinogram error 204 is then transformed at a transformation step 206 back to the image domain to produce a correction image 208. Thus, in a subsequent iteration, the correction image 208 is used along with the previous reconstructed image 212 to create an updated reconstructed image 212 in an update step 210. Thereafter, the process is repeated for a desired number of iterations or until some other stopping criterion is met, such as, for example, a predetermined spatial resolution. The reconstructed image 212 is reconstructed through the use of an algorithm having certain characteristics. For example, a preferred algorithm used to create the reconstructed image 212 may be capable of reconstructing the object with a voxel size commensurate with the size of the features that are the focus of the detection. Preferably, the algorithm used to create the reconstructed image 212 may be capable of reconstructing the object with a voxel size of five cubic millimeters. A more preferred algorithm may be capable of reconstructing the object with a voxel size of two cubic millimeters. At that point, the reconstructed image 212 is communicated to both the short-term storage 90 and the AED stage 108 within the CAD subsystem 100'.

The AED stage 108 performs an analysis of the image data 212 to ascertain whether there is an area of interest within that image data. The AED stage 108 may be programmed to utilize an algorithm that specifically searches for a specific characteristic feature, such as, for example, mass, density, composition, surface area, surface area to volume ratio, edge characteristics, or shape. If an area of interest is found within the image data 212, for example an object is ascertained to be within the image data 212, area of interest image data 101 is communicated to both the short-term storage 114 and the reconstruction stage 86. The reconstruction stage 86 performs the same reconstruction methodology as described above. The reconstruction stage 86 will be programmed with an algorithm designed to sharpen the are of interest image data 101. For example, the reconstruction stage 86 may include an algorithm that is capable of reconstructing the area of interest image data 101, i.e., the object, with a voxel size of one cubic millimeter or less. Such an algorithm will, of necessity, entail more computational time than the algorithm of the reconstruction stage 84.

Once the stop criterion has been met, i.e., a spatial resolution of one cubic millimeter or less has been achieved by the reconstruction stage 86, the reconstructed area of interest image data 103 is communicated to the short-term storage 90 and to the AED stage 110, at which further analysis of the area of interest is performed. The AED stage 110 performs further analysis of the area of interest, comparing it with various exemplary objects. Provided more information, i.e., better resolution is required, reanalyzed area of interest image data 105 is then communicated to the short-term storage 114 and the reconstruction stage 88, which will include an algorithm entailing even greater computational time than the algorithms of the reconstruction stages 84 and 86. For example, the reconstruction stage 88 may include an algorithm effective at reducing artifacts in the image data generally caused by metallic objects. Alternatively, the reconstruction stage 88 may include an algorithm effective at varying the voxel size in the image data, or effective at compensating for noise in the image data, or directed at iteratively and statistically reconstructing the image data. As another alternative, the reconstruction stage 88 may include an algorithm effective at varying the parameters for material decomposition to optimize detection of an explosive material or device. Further, as yet another alternative, a dual energy scan may be employed to provide two sets of data, one exhibiting a high energy signature and another exhibiting a low energy signature. After subjecting the reanalyzed area of interest image data 105 to the reconstruction stage 88, re-reconstructed area of interest image data 107 is communicated to the short-term storage 90 and the AED stage 112, at which a final analysis is performed. Further, a signal is sent via the link 106 to the decision node 24 to pull a specific piece of luggage 22n out of line to the aircraft 150 and into the alarm resolution area 142 if the area of interest has not been resolved sufficiently to ascertain that the object is not harmful.

The re-reconstructed area of interest image data 107 is then communicated to the alarm resolution subsystem 120 via the link 118. The operators manning the operator consoles. 130 can review the re-reconstructed area of interest image data 107 as well as the image data stored in the short-term storage 114 and any other information, such as material composition, etc. If the operators are able to resolve the area of interest to be an object that is not harmful, a signal is sent via the link 128 to the decision node 144 to release the specific piece of luggage 22n back to the aircraft 150. If the operators cannot resolve the area of interest sufficiently, a signal is sent via the link 128 to the decision node 144 to send the specific piece of luggage 22n to the manual inspection holding area 146 for a manual search.

Figure 10:
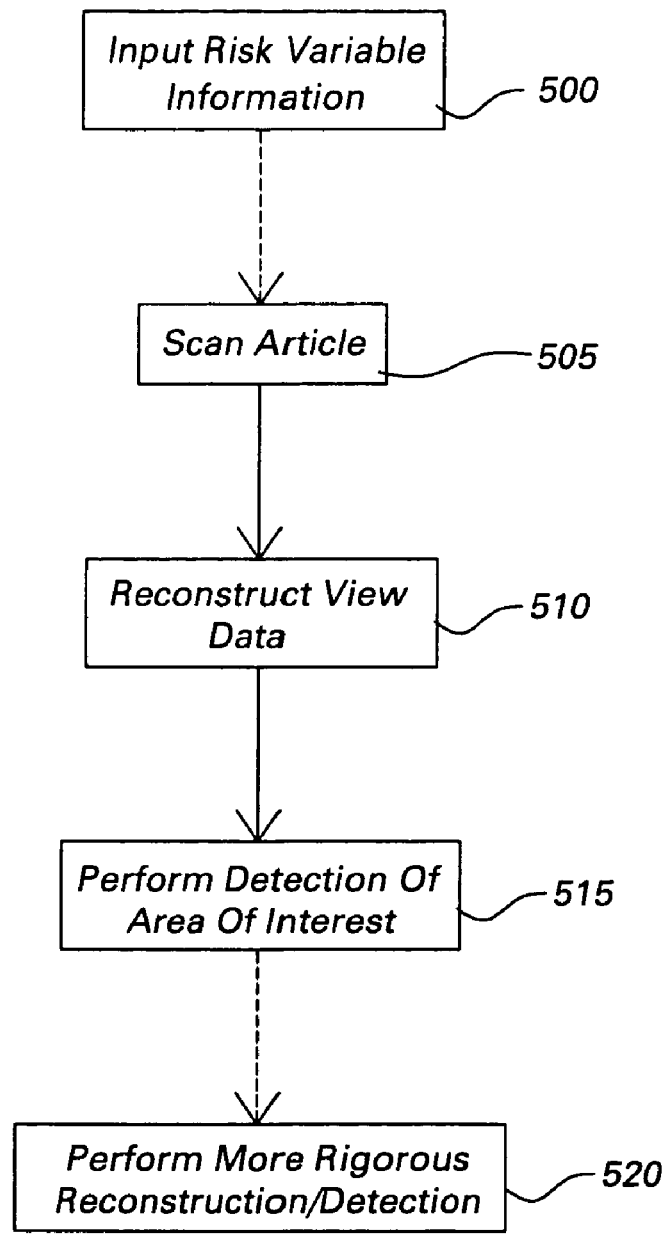
FIG. 10 illustrates an exemplary method for detecting an object within an article.

With specific reference to FIGS. 9 and 10, next will be described an exemplary process for detecting an object located within an enclosed article, such as, for example, luggage 22n. Each piece of luggage 22n has associated with it certain risk variables. At the risk variable subsystem 20 (FIGS. 1, 2), specific risk variable information 21 is associated with each piece of luggage 22n at Step 500 (FIG. 10). These risk variables 21 are communicated to the CAD subsystem 100' (FIG. 2). The luggage 22n is then scanned by the acquisition subsystem 30 at Step 505. It should be appreciated that other acquisition subsystems may be utilized, such as, for example, acquisition subsystem 230 (FIG. 5), 330 (FIG. 6) or 430 (FIGS. 7a, 7b).

The acquisition subsystem 30 formulates intensity measurements that are generated into view data, or projection data, 200 from the scan of the luggage 22n. The view data 200 is communicated to the reconstruction subsystem 80 (or the intensity measurements are communicated to, and are generated into view data at, the reconstruction subsystem 80') namely the reconstruction stage 84, via link 82 (FIG. 9). The reconstruction stage 84 reconstructs the view data 200 into image data 212 at Step 510. For example, the reconstruction stage 84 may utilize an algorithm that reduces the view data 200 into image data 212 having a spatial resolution of two cubic millimeters. The image data 212 is then communicated to the short-term storage 90 (FIGS. 1, 2) and also to the CAD subsystem 100', specifically the AED stage 108. At Step 515, the AED stage 108 performs a preliminary analysis of the image data 212 to ascertain whether the image data 212 contains any area of interest. Any such area of interest image data 101 (FIG. 9) is communicated to the short-term storage 114 (FIGS. 1, 2) and to the reconstruction stage 86.

A more rigorous reconstruction and analysis of the area of interest image data 101 are then performed at Step 520 (FIG. 10). Specifically, the reconstruction stage 86 utilizes an algorithm that is intended to enhance the clarity of the area of interest image data 101 by reconstructing the area of interest image data 101 into reconstructed area of interest image data 103. For example, the reconstruction stage 86 may utilize an algorithm that prepares the reconstructed area of interest image data 103 with a voxel size of one cubic millimeter or less. Alternatively, the reconstruction stage 86 may utilize an algorithm that lessens artifacts in the reconstructed area of interest image data 103. The reconstructed area of interest image data 103 is then communicated to the short-term storage 90 and to the AED stage 110. The AED stage 110 analyzes the reconstructed area of interest image data 103 and prepares reanalyzed area of interest image data 105, which is communicated both to the short-term storage 114 and to the reconstruction stage 88. The reconstruction stage 88 utilizes yet another algorithm intended to glean even more explicit information from the reanalyzed area of interest image data 105 to ascertain the object within the luggage 22n. The reconstruction stage 88 may utilize an algorithm adapted to vary the voxel size in the reanalyzed area of interest image data 105, or an algorithm adapted to compensate for noise in the reanalyzed area of interest image data 105, or an algorithm adapted to iteratively and statistically reconstruct the acquired information into the image data, or any other suitable algorithm. This re-reconstructed area of interest image data 107 is communicated to the short-term storage 90 and to the AED stage 112 for a final analysis.

At any point in the analysis performed by the CAD subsystem 100', the risk variables 21 may be utilized to alter the parameters of the analysis. Similarly, information from other sources, i.e., the alternative modality subsystem 60 or a dual energy discriminating scan, may be communicated to the CAD subsystem 100' to alter its analysis parameters.

In an alternative process, the acquisition subsystem 30 may communicate the view data 200 directly to the AED stage 108 of the CAD subsystem 100'. The AED stage 108 then analyzes the view data 200 to ascertain an area of interest therein, and communicates that area of interest view data to the reconstruction stage 84. The reconstruction stage 84 then reconstructs the area of interest view data into area of interest image data. The remainder of this alternative process follows the process steps described above with regard to FIGS. 9 and 10.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. For example, while the acquisition subsystems have been described and illustrated with circular or ringed geometries, it should be appreciated that other suitable geometries, such as multiple linear source/detector geometries, are within the scope of the invention. Furthermore, although the illustrated acquisition subsystems have been shown as having a CT scanner with detectors positioned in a circular pattern, it should be appreciated that planar arrays of detectors or any other configuration of detectors may be utilized provided they are capable of obtaining a full set of view data for the subject article being scanned. Also, although CT scanners have been illustrated as exemplary components of acquisition subsystems, it should be appreciated that a suitable x-ray based system, such as, for example, digital radiography, may be employed. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed as new and desired to be protected by Letters Patent of the United States is:

1. A system for detecting an object, comprising:
   an acquisition subsystem adapted to acquire information pertaining to the object, wherein the acquisition subsystem comprises a computed tomography machine comprising at least one x-ray source and at least one detector;
   a reconstruction subsystem for reconstructing acquired information pertaining to the object into image data, wherein the reconstruction subsystem comprises a plurality of reconstruction stages, further wherein the reconstruction subsystem comprises multiple stages that perform multi-stage reconstructions;
   a computer-aided detection subsystem for analyzing the image data; and
   a feedback loop between the reconstruction subsystem and the computer-aided detection subsystem for automatically determining whether to initiate additional stages of the plurality of reconstruction stages as a function of reconstructed acquired image data and risk variables associated with the object.

2. The system of claim 1, wherein the computer-aided detection subsystem is adapted to identify an area of interest within the image data.

3. The system of claim 2, wherein the computer-aided detection subsystem is adapted to analyze view data and to direct the reconstruction subsystem to compute the image data for the area of interest.

4. The system of claim 2, wherein the computer-aided detection subsystem is adapted to communicate image data of the area of interest to the reconstruction subsystem and to direct the reconstruction subsystem to recompute the image data of the area of interest.

5. The system of claim 1, wherein the computed tomography machine comprises:
   an x-ray source;
   a detector array; and
   a rotating gantry, said x-ray source being mounted opposite said detector array on said rotating gantry.

6. The system of claim 1, wherein the computed tomography machine comprises:
   a movable x-ray source; and
   a ring of stationary detectors.

7. The system of claim 1, wherein the computed tomography machine includes a stationary source and a stationary detector.

8. The system of claim 7, wherein the computed tomography machine comprises:
   a vacuum housing chamber for generating an electron beam;

a target for receiving the electron beam and emitting x-rays in response to the electron beam; and a detector array located opposite the target for receiving the emitted x-rays.

9. The system of claim 7, wherein the computed tomography machine comprises:

an x-ray source ring including a plurality of stationary x-ray sources; and a stationary detector ring offset from the x-ray source ring and including a plurality of discrete detector modules.

10. The system of claim 1, wherein the computer-aided detection subsystem comprises a plurality of computer-aided detection stages.

11. The system of claim 10, wherein each one of the plurality of computer-aided detection stages is in communication with any of the plurality of reconstruction stages.

12. The system of claim 1, wherein the computer-aided detection subsystem comprises multiple stages that perform multi-stage detections.

13. The system of claim 1, further comprising a trace detection subsystem.

14. The system of claim 1, further comprising a coherent scattering detection subsystem.

15. The system of claim 1, further comprising a quadrupole resonance subsystem.

16. The system of claim 1, wherein the computer-aided detection subsystem is adapted for detecting an object located within a piece of luggage.

17. The system of claim 1, wherein the computer-aided detection subsystem is adapted for detecting an object located within a human being.

18. The system of claim 1 wherein the computer-aided detection subsystem is adapted for detecting an object located within clothing worn by a human being.

19. The system of claim 1 wherein the computer-aided detection subsystem is adapted for detecting an object located within a parcel.

20. The system of claim 1, wherein the computer-aided detection subsystem is adapted for detecting an explosive device.

21. A system for detecting an explosive device within an article, comprising:

an acquisition subsystem comprising a scanning device having at least one scanning detector for acquiring view data of the contents of an article, wherein the acquisition subsystem comprises a computed tomography machine comprising at least one x-ray source and at least one detector;

a reconstruction subsystem comprising a plurality of reconstruction stages for reconstructing the view data into image data;

a computer-aided detection subsystem comprising a plurality of computer-aided detection stages for analyzing the image data; and a feedback loop between the reconstruction subsystem and the computer-aided detection subsystem for automatically determining whether to initiate additional stages of the plurality of reconstruction stages as a function of reconstructed acquired image data and risk variables associated with the object and for analyzing to ascertain whether the contents of the article include an explosive device.

22. The system of claim 21, wherein the computer-aided detection subsystem is adapted to identify an area of interest of the contents within the image data.

23. The system of claim 22, wherein the computer-aided detection subsystem is adapted to analyze the view data and to direct the reconstruction subsystem to compute the image data for the area of interest.

24. The system of claim 22, wherein the computer-aided detection subsystem is adapted to communicate the image data of the contents to the reconstruction subsystem and to direct the reconstruction subsystem to recompute the image data of the contents into image data of the area of interest.

25. The system of claim 21, further comprising a means for transporting the article.

26. The system of claim 21, wherein the plurality of reconstruction stages comprises a first reconstruction stage including an algorithm adapted to reduce artifacts in the view data.

27. The system of claim 21, wherein the plurality of reconstruction stages comprises a first reconstruction stage including an algorithm adapted to vary the voxel size in the reconstructed view data.

28. The system of claim 21, wherein the plurality of reconstruction stages comprises a first reconstruction stage including an algorithm adapted to compensate for noise in the view data.

29. The system of claim 21, wherein the plurality of reconstruction stages comprises a first reconstruction stage including an algorithm adapted to iteratively and statistically reconstruct the view data into image data.

30. The system of claim 21, wherein each one of the plurality of computer-aided detection stages is in communication with any of the plurality of reconstruction stages.

31. The system of claim 21, further comprising a trace detection subsystem.

32. The system of claim 21, further comprising a coherent scattering detection subsystem.

33. The system of claim 21, further comprising a quadrupole resonance subsystem.

34. A system for detecting an object located within an article, comprising:

a reconstruction subsystem for reconstructing acquired information pertaining to an object into image data, wherein the reconstruction subsystem comprises a plurality of reconstruction stages, further wherein the reconstruction subsystem comprises multiple stages that perform multi-stage reconstructions;

a computer-aided detection subsystem adapted to analyze the image data; and a risk variables subsystem for dynamically adjusting the computational load of the reconstruction and computer-aided detection subsystems by automatically determining whether to initiate additional stages of the plurality of reconstruction stages as a function of reconstructed acquired image data and risk variables associated with the object.

35. The system of claim 34, wherein the risk variables subsystem is adapted to adjust the rigorousness of the reconstruction of the acquired information based upon generated risk variables.

36. The system of claim 35 adapted for use at a place of embarkation.

37. The system of claim 35, wherein the generated risk variables comprise at least one risk variable from the group consisting of a level of terrorist threat perceived at a location of the system, a destination of the article, the day of the year, and the profile of an individual associated with the article.

38. A method for detecting an explosive device within an article, comprising:

acquiring view data of an object located within an article from a scanning device, using a computed tomography machine comprising an x-ray source and a detector;

communicating the view data of the object to a plurality of reconstruction stages;

reconstructing the view data of the object into image data of the object with at least one of the plurality of reconstruction stages;

analyzing the image data of the object and risk variables of the object to identify whether the object is an explosive device; and determining whether to reconstruct the view data of the object into image data with additional reconstruction states of the plurality of reconstruction stages as a function of said analyzing the image data.

39. The method of claim 38, wherein the analyzing the image data of the object step is accomplished with a plurality of computer-aided detection stages.

40. The method of claim 38, wherein the analyzing the image data of the object step comprises comparing the image data of the object to image data of known objects.

41. The method of claim 38, further comprising generating risk variables associated with the article in which the object is located.

42. The method of claim 38, wherein the rigorousness of the analysis of the image data is affected by the risk variables generated.

43. The method of claim 38, further comprising detecting trace amounts of chemical.

44. The method of claim 38, further comprising transporting the article to the scanning device with a conveyor belt.

45. A method for detecting an object located within an article, comprising the steps of:

reconstructing with a reconstruction subsystem acquired information pertaining to an object into image data, wherein the reconstruction subsystem comprises a plurality of reconstruction stages, further wherein the reconstruction subsystem comprises multiple stages that perform multi-stage reconstructions;

analyzing the image data based on generated risk variables; and dynamically adjusting the computational load of the reconstructing step as a function of the analyzing step by determining whether to reconstruct the acquired information with an additional stage of the reconstruction subsystem.

46. The method of claim 45, wherein the dynamically adjusting the computational load step includes adjusting the rigorousness of the reconstruction step based upon generated risk variables.

47. The method of claim 46, wherein the generated risk variables comprise at least one risk variable from the group consisting of a level of terrorist threat perceived at a location of the system, a destination of the article, the day of the year, and the profile of an individual associated with the article.

* * * * *